United States Patent
Govindaraju et al.

(10) Patent No.: US 8,489,779 B2
(45) Date of Patent: Jul. 16, 2013

(54) SYSTEMS AND METHODS FOR AUTO ADDRESSING IN A CONTROL NETWORK

(75) Inventors: Sangeetha Govindaraju, Vellore (IN); Geetha Chandrasekaran, Chennai (IN); VigneshKumar M. R. N. Natesan, Madurai (IN); Karthika K. Kannan, Madurai (IN); Rajesh Kulandaivel K S Sankarapandian, Madurai (IN); Harini S. Seetharaman, Ciambatore (IN); Muthu Lakshmi Sundharam, Madurai (IN)

(73) Assignee: Honeywell International Inc., Morristown, NJ (US)

( * ) Notice: Subject to any disclaimer, the term of this patent is extended or adjusted under 35 U.S.C. 154(b) by 93 days.

(21) Appl. No.: 13/023,446

(22) Filed: Feb. 8, 2011

(65) Prior Publication Data

US 2011/0196990 A1    Aug. 11, 2011

(51) Int. Cl.
*G06F 3/00* (2006.01)

(52) U.S. Cl.
USPC ..................................... 710/9; 710/8; 710/10

(58) Field of Classification Search
None
See application file for complete search history.

(56) References Cited

U.S. PATENT DOCUMENTS

| | | | |
|---|---|---|---|
| 5,249,269 A | 9/1993 | Nakao et al. | |
| 5,654,531 A | 8/1997 | Farabee et al. | |
| 5,831,546 A | 11/1998 | Costa et al. | |
| 6,901,439 B1 | 5/2005 | Bonasia et al. | |
| RE38,812 E | 10/2005 | Acres et al. | |
| 7,069,345 B2 | 6/2006 | Shteyn | |
| 7,359,989 B2 | 4/2008 | Orava et al. | |
| 7,987,247 B2 | 7/2011 | Westphal et al. | |
| 8,175,611 B2 * | 5/2012 | Gupta et al. | 455/452.1 |
| 2002/0196761 A1 | 12/2002 | Kaneko | |
| 2004/0111501 A1 | 6/2004 | Lee et al. | |
| 2004/0208184 A1 * | 10/2004 | Tanaka et al. | 370/397 |
| 2005/0125579 A1 | 6/2005 | Bui et al. | |
| 2007/0043476 A1 | 2/2007 | Richards et al. | |

(Continued)

FOREIGN PATENT DOCUMENTS

GB            2456688 B        8/2011

OTHER PUBLICATIONS

"Appendix E-Derived Network Addressing", Delta Controls, ORCAview Version 3.30 Technical Reference Manual, Rev. 1.30, Original p. E-1, 39 pages, prior to Nov. 30, 2011.

(Continued)

*Primary Examiner* — Idriss N Alrobaye
*Assistant Examiner* — David Martinez
(74) *Attorney, Agent, or Firm* — Seager Tufte & Wickhem LLC.

(57) ABSTRACT

Described herein are systems and methods for device management, and more particularly systems and methods for auto addressing in a control network. For example, some embodiments relate to procedures and protocols implemented in the context of a building management system thereby to allow auto addressing of IO devices. In one embodiment, each IO device includes a respective engineering data key (EDK), which is indicative of device data such as the device type and function. This EDK is combined with a generated number thereby to define a device identification code that has significant chances of uniqueness. The device identification code is communicated to a controller to which the IO device connects in a bus-based topology. The controller uses the identification code to assign a network address to the IO device, using a stored repository of network addresses available for such assignment.

10 Claims, 4 Drawing Sheets

U.S. PATENT DOCUMENTS

2008/0310425 A1* 12/2008 Nath et al. ............... 370/395.54
2009/0271001 A1   10/2009 Westphal et al.
2010/0257377 A1* 10/2010 Ejiri et al. .................... 713/193

OTHER PUBLICATIONS

"BACnet Protocol implementation Conformance Statement", Delta Controls, Delta ORCAview 3.30, Aug. 14, 2003.

"MSTP Auto-Addressing", 7 pages, Apr. 15, 2008.

Cheng et al., "Enhancement of Token Bus Protocols for Multimedia Applications", IEEE, IBM T.J. Watson Research Center, 1063-639019, p. 30-36, 1993.

Kastner et al., "Communication Systems for Building Automation and Control", Proceedings of the IEEE, vol. 93, No. 6, p. 1178-1203, Jun. 2005.

* cited by examiner

SYSTEMS AND METHODS FOR AUTO ADDRESSING IN A CONTROL NETWORK

This application claims the benefit of Australian Patent Application No. 2010900517, filed Feb. 9, 2010. Australian Patent Application No. 2010900517, filed Feb. 9, 2010, is hereby incorporated by reference.

FIELD OF THE INVENTION

The present invention relates to device management, and more particularly to systems and methods for auto addressing in a control network. For example, some embodiments relate to procedures and protocols implemented in the context of a building management system thereby to allow auto addressing of IO devices.

Embodiments of the invention have been particularly developed for providing an infrastructure whereby IO devices of a building management system are able to connect and communicate with a controller via a bus arrangement, and the communication between the IO devices and controller is configured such that unique network addresses are able to be reliably assigned to the respective IO devices. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

In the context of a building management system (BMS), a large number of input/output (TO) devices are connected to one or more controllers, thereby to integrate these IO devices into the BMS. For example, the IO devices can take the form of analog inputs (such as temperature, humidity and pressure sensors), digital inputs (for example a digital input that indicates whether a device active or not) analog outputs (such as a variable frequency drive, an I-P transducer, or a valve/damper actuator), and digital outputs (for example those used to open and close relays and switches).

In known systems, a controller is directly connected to every device. A configuration tool is used to download to the controller data for each connected device, such as the device name, type and properties, and control loops used to control the device. This requires a significant amount of manual effort.

In more recent times, there has been a shift towards the possibility of connecting IO devices via a bus-based topology. In moving to such a bus-based topology, complications arise in the context of addressing the individual IO devices.

It follows that there is a need in the art for improved systems and methods for managing IO devices in a BMS.

SUMMARY

It is an object of the present invention to overcome or ameliorate at least one of the disadvantages of the prior art, or to provide a useful alternative.

One embodiment provides a method for assigning network addresses to a plurality of IO devices in a control network, wherein the plurality of IO devices are connected to the controller through a common bus, the method including:

at the controller, maintaining data indicative of a plurality of assignable network addresses;

at a given IO device: defining a device identification code; storing the device identification code in local memory; and providing to the controller data indicative of a request for a network address, wherein the request includes the device identification code;

at the controller: receiving from the given IO device the data indicative of the request for a network address; identifying, from the data indicative of a plurality of assignable network addresses, a network address for assignment to the given IO device; providing to the given IO device data indicative of the identified network address and the device identification code; maintaining data indicative of the assignment of the identified network address to the given IO device; and at the given IO device: receiving from the controller the data indicative of the identified network address and the device identification code; verifying the received device identification code matches the device identification code stored in local memory; and in the case that the verification is successful, applying the identified network address.

One embodiment provides a control network including:

a controller configured to maintain data indicative of a plurality of assignable network addresses; and a plurality of IO devices are connected to the controller through a common bus, each IO device being configured to define a device identification code, store the device identification code in local memory, and provide to the controller data indicative of a request for a network address, wherein the request includes the device identification code;

wherein the controller is additionally configured to receive from each IO device the respective data indicative of a request for a network address, identify, from the data indicative of a plurality of assignable network addresses, respective network addresses for assignment to IO devices, respectively provide to the IO devices data indicative of the identified network addresses and the device identification code, and maintain data indicative of the respective assignment of the identified network address to the IO devices; and wherein the IO devices are additionally configured to receive from the controller the data indicative of the network addresses and associated device identification codes and, in the case that the associated device identification code that stored in local memory, apply the network address.

One embodiment provides a method for assigning network addresses to a plurality of IO devices in a control network, wherein the plurality of IO devices are connected to the controller through a common bus, the method including operating the controller to auto assign network addresses to the IO devices based on respective messages received from the IO devices, wherein each message includes device data for the respective device, the device data including data indicative of at least one of the device type and the device functionality.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for device management, and more particularly systems and methods for auto addressing in a control network. For example, some embodiments relate to procedures and protocols implemented in the context of a building management system thereby to allow auto addressing of IO devices. In one embodiment, each IO device includes a respective engineering data key (EDK), which is indicative of device data such as the device type and function. This EDK is combined with a generated number thereby to define a device identification code that has significant chances of uniqueness. The device identification code is communicated to a controller to which the IO device connects in a bus-based topology. The controller uses the identification code to assign a network address to the IO device, using a stored repository of network addresses available for such assignment.

System Level Overview

Figure 1:
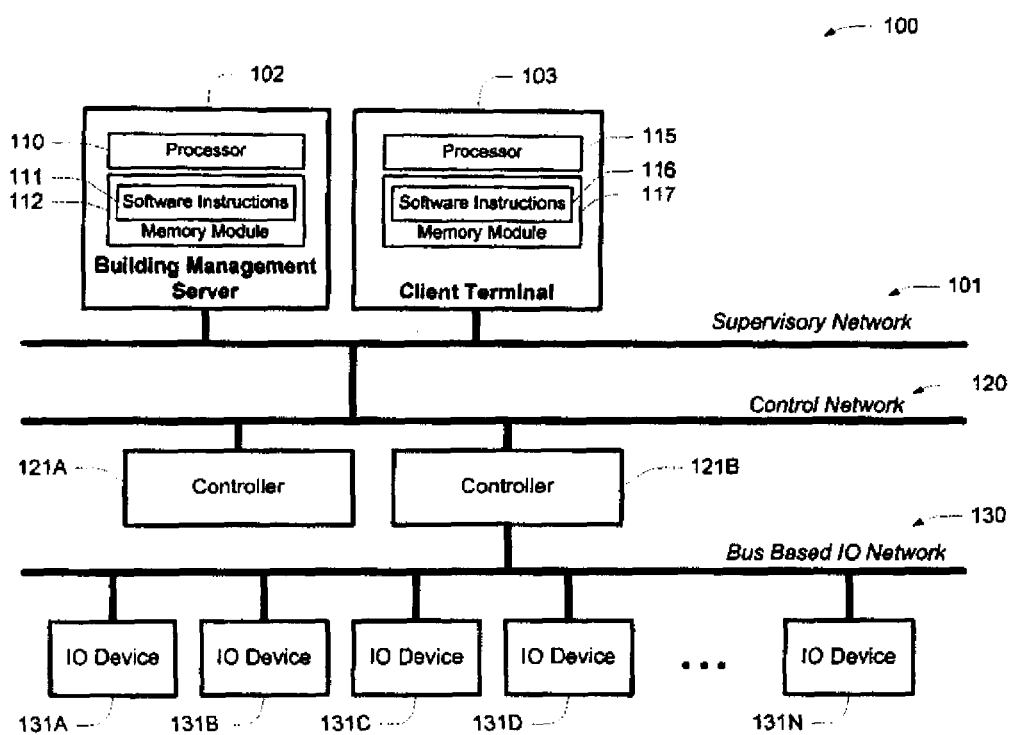
FIG. 1 schematically illustrates a system according to one embodiment.

FIG. 1 illustrates a building management system (BMS) 100 according to one embodiment. Although a BMS is used for the purposes of the present example, it will be appreciated that other embodiments are applicable to control networks in contexts other than building management systems. To that end, the technologies described herein are applicable to substantially any control networks where IO devices require addresses for the purposes of controller-device communications.

BMS 100 includes a supervisory network 101, which is in the present embodiment provided over Ethernet. However, various other network arrangements may be used. Supervisory network 101 includes at least one building management server 102, and one or more client terminals 103.

Server 102 provides the substantive software-level functionalities for building management, for example by providing a building management product (such as a BMS provided by a vendor, e.g. Honeywell). In general terms, server 102 includes a processor 110 for executing software instructions maintained 111 on a memory module 112.

Client terminals 103 (which may include the likes of PCs, portable computers, PDAs and other such devices) interact with server 102 over network 101, thereby to provide to users of those terminals user interface components for allowing user interaction with the BMS. For example, in some embodiments the client terminals render user interface components via respective web browser applications, which obtain code for the user interface components from server 102. In general terms, each client terminal 103 includes a processor 115 for executing software instructions maintained 116 on a memory module 117.

Supervisory network 101 is coupled to a control network 120, which is in the present embodiment provided over TCP/IP. In some embodiments there are multiple control networks. Control network 120 allows communication between supervisory network 101 and a plurality of controllers, such as controller 121A and controller 121B. These controllers, which may for example be XL10 controllers or the like, are configured for connecting to one or more IO devices of BMS 100. In broad terms, a building management system includes a plurality of IO devices, which may include the likes of analog inputs (such as temperature, humidity and pressure sensors), digital inputs (for example a digital input that indicates whether a device active or not) analog outputs (such as a variable frequency drive, a I-P transducer, or a valve or damper actuator), and digital outputs (for example those used to open and close relays and switches).

In the present embodiment, each controller connects to one or more IO devices via a respective bus based IO network 130. In this manner, the devices are able to be connected to and/or disconnected from the controller as required. In the context of FIG. 1, controller 121B is connected to IO devices 131A, 131B . . . 131N via bus based network 130. Although FIG. 1 suggests a wired connection, it should be recognized that embodiments of the present technology are particularly well suited for situations where IO devices connect to the controller via a wireless network protocol, such as an 802.11 variant or the like. This is especially significant noting popular shifts towards the adoption of wireless technologies in control networks and building management systems.

In the present embodiment, each IO device is configured to communicate its own device data to the controller upon connecting to the controller. In the present embodiment, this is achieved using an EDK (engineering data key). Specifically, each IO device includes a processor and associated memory, and the memory is configured to carry the EDK. The EDK is indicative of device data, such as the device type and a function code. This data allows the controller to meaningfully interact with the device. For example, the controller will know whether the device is an analogue output that provides a signal indicative of a value, or a digital input that is controlled in a certain manner. In some embodiments much of the detailed information is stored other than at the device/controller, and the EDK is used by the controller to obtain the relevant information (such as control loop information). In the present embodiment, the EDK is a numeric code to indicate the functionality of the point the context of the specific BMS implementation.

In terms of EDKs, each IO device has an integrated IO processor. This IO processor is used to give the IO the intelligence to communicate with its controller in the context of the bus-based infrastructure. For example, during manufacture, a sensor manufacture packages an IO processor and IO sensor in to a single unit. At this time of integration, the sensor vendor may embed some kind of input device in to the IO, for a field engineer to key in values during the time of installation. Typically, the input parameters can be related to zone control or the like, and the EDK.

The use of device data, such as the present EDK, is of significant practical use in the sense that it reduces the engineering requirements for a BMS or other control network. Devices are able to autonomously inform their respective controllers in respect of important aspects of configuration, significantly streamlining configuration processes. For instance, upon connection of an IO device in the form of an analogue temperature sensor, the controller receives device data and is made aware that the device is an IO device in the form of an analogue temperature sensor.

In the present infrastructure, it is necessary that the controller be able to uniquely identify each IO device on its bus-based network. This requires device addressing, which can be a resource intensive process. Given the number of devices, and the fact that IO devices may come from a range of vendors, straightforward approaches such as random generation and/or pre-packaged addressing are not appropriate.

In this regard, the EDK is presently used to allow for auto-addressing, thereby to facilitate the assignment of network addresses to IO devices by the controller. In overview, the EDK is combined with a generated identifier thereby to define a unique identifier that is communicated to the controller, and used by the controller to identify a network address for the device. In the present embodiments the generated identifier includes a timestamp derived from network information. This is discussed in more detail further below.

Auto Addressing Method Overview

Figure 2:
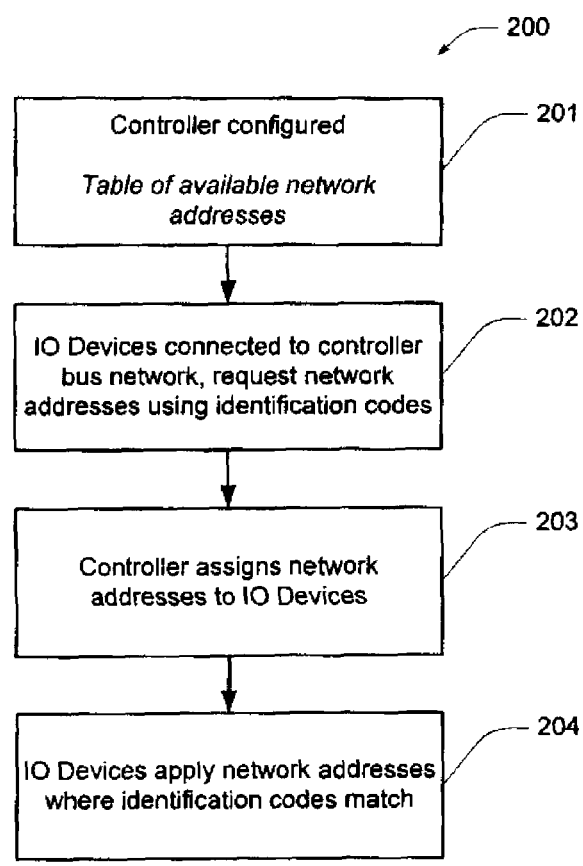
FIG. 2 illustrates a method according to one embodiment.

In overview, one embodiment provides a method for assigning network addresses to a plurality of IO devices in a control network, such as devices 131A-131N of control network 130 in BMS 100. The plurality of IO devices are connected to the controller through a common bus. An example of such a method is provided in FIG. 2, which illustrates a method 200.

Step 201 includes configuration of the controller with a table indicative of available network addresses. In this manner, the controller is configured for maintaining data indicative of a plurality of assignable network addresses. As a starting point, any controller on a control network has a maximum number of devices it can control. For the present purposes, each controller is configured to maintain a table containing data indicative of addresses that can be present, based on the number of IO devices it can support. The table includes data indicative of addresses, and data indicative of whether those addresses are available to be assigned to IO devices. For example, each address in the table includes an identifier to show whether it is taken by a device on the network, or available to be assigned to a device on the network.

IO devices connect to the network at step 202, and upon connection request network addresses from the controller. The manner by which network addresses are requested includes the use of a device identification code, which is defined to provide uniqueness between devices in the network. As discussed in more detail further below, some embodiments make use of a combination between device data (in the form of the EDK) and a generated number (for example using timestamp information).

At step 203, the controller assigns network addresses to the IO devices, making use of information stored in the table indicative of available network addresses. The unique assignment of addresses is facilitated by use of the devices respective device identification codes. These identification codes are again used when informing the devices of assigned addresses. That is, by communicating addresses to the devices along with data indicative of the device identification code for the device to which that address is assigned, allows the correct devices to apply the correct addresses at step 204. A more detailed auto addressing example is provided further below.

In some embodiments, whenever an IO device requests for a network address it shall add an identification code to the request. The identification code shall consists of the point details of the IO device, such as device type (AI, AO, DI, DO) and three random numbers generated independently. The IO device shall store this temporary identification code in its local memory until it obtains a network address.

The controller, on receiving a request from an IO device for network address, shall check the address table for a free network address for the IO and send it back to the IO. The message sent by the Controller can be identified by the IO device if the Controller appends the identification code also along with its response to the device. The controller shall also change the status of availability of the Network address from "Available" status to "Assigned" status.

Once the IO device receives a response from the Controller it checks the identification code. If the identification code matches, then it stores the network address provided by the controller and uses it as the address till it is connected to the network. If the IO device does not receive a network address for a certain period, then it shall wait for a random amount of time and repeat the above mentioned process.

Exemplary Addressing Method

Figure 3:
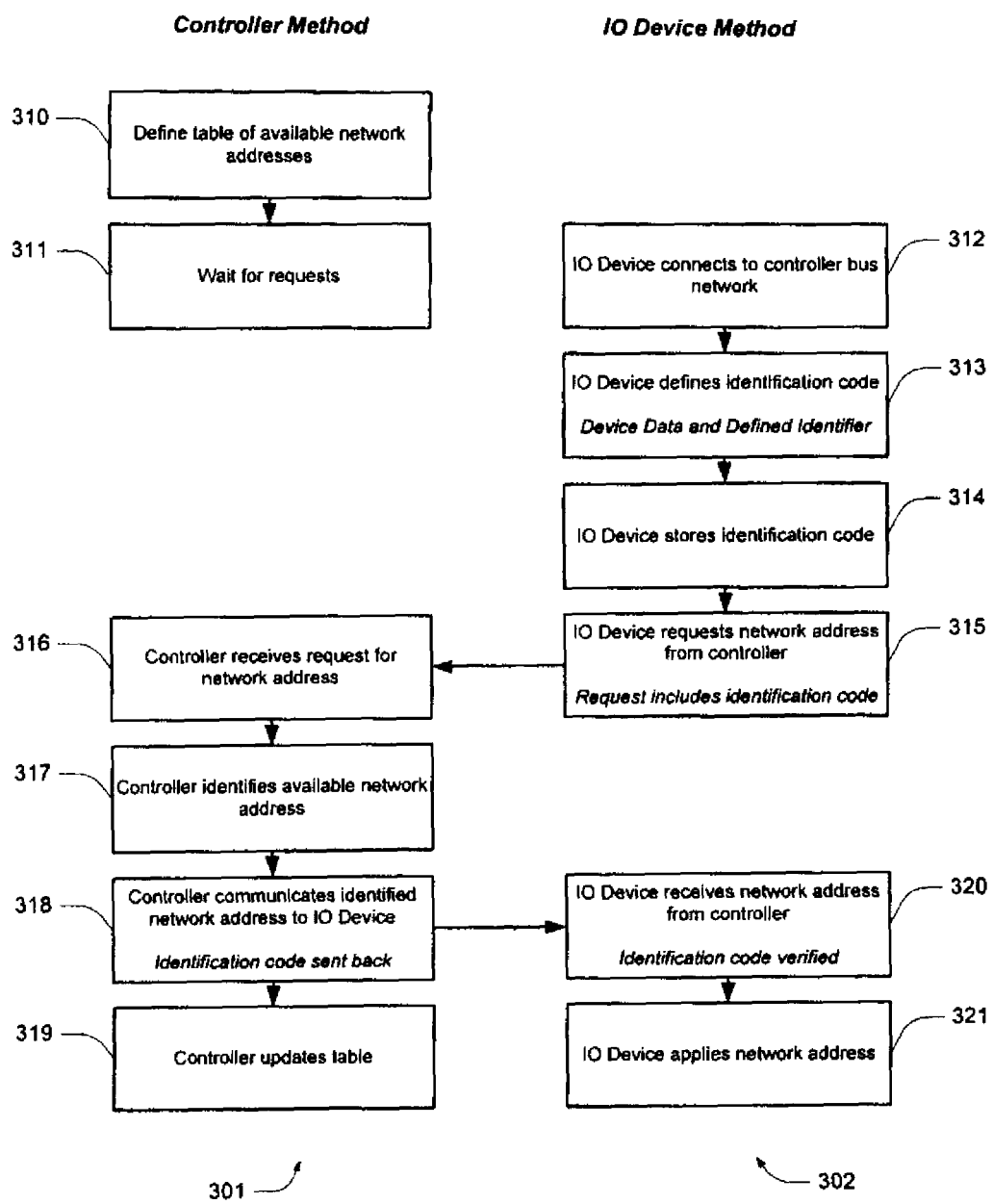
FIG. 3 illustrates a method according to one embodiment.

FIG. 3 illustrates a controller method 301 and device method 302 respectively performed by a controller and IO device for the purpose of auto addressing in a control network. These methods are performed based on computer executable code maintained at the respective devices.

At step 310, the controller defines its table indicative of available network addresses, and subsequently waits for IO device requests at step 312. In some embodiments the controller takes positive action at this time to assist the provision of requests, for example by providing beacon frames or the like over the network.

An IO device connects to a controller at step 312. As noted, this may follow a wired network connection or wireless network connection. The device then commences a process for obtaining an address from the controller. Step 313 includes defining a device identification code. In the present embodiment, the device identifier includes a generated identifier and device data (in the form of the device EDK).

Critical to auto addressing is ensuring the uniqueness of the device identification code. In the present embodiment, an identifier is generated with time stamping by the IO processor. The time stamping is in some cases achieved using a Real Time Controller embedded in the IO module. The time stamp is optionally obtained in any of the following ways:

Regular messages sent by the controller (such as "keep alive" messages). This is particularly useful when no nodes are connected to the network.

Listening to existing network traffic, and extracting a timestamp accordingly.

During initial boot up of the IO processor.

The time when the controller's polling for address reaches the IO processor.

It is assumed that such a time is unique for every IO processor. Usually, a RTC is capable of giving year, date, time in seconds. A simple logic can be used to generate a number with this time stamp. To improve further uniqueness, EDK information of the IO device which is stored in the IO processor memory during the programming of the processor is also appended to this random number, thereby to define the device identification code.

Figure 4:
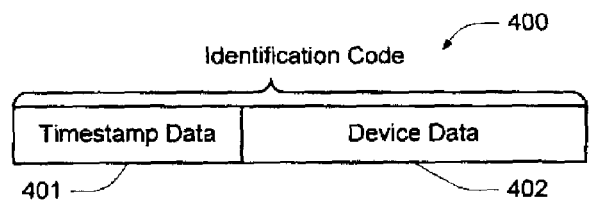
FIG. 4 schematically illustrates a data packet according to one embodiment.

The EDK information consists of 9 bytes which is added to the 2 byte random number giving a total of 11 byte unique number. This is schematically represented in FIG. 4, which shows an exemplary device identification code 400 including timestamp data 401 and EDK data 402.

The IO processor stores the device identification code in local memory at step 314 sends the device identification code to the controller at step 315 along with a request for a network address.

The controller receives the request for network address at step 316. The controller identifies an available network address at 317, communicates that back to the IO device at 318 (along with the device identification code, noting that the device does not yet have a network address), and updates its local memory with data indicative of the assignment. For example, the controller stores this network address against the device EDK in a table for further reference.

At step 320, the IO device receives communications including a network address and device identification code. The device then verifies that the device identification code matches the device identification code stored in memory, thereby to confirm whether the address in question is intended for that IO device. In the case that the codes match, the network address is applied at 321. Otherwise, no action is taken. Furthermore, if no address is received within a predetermined period of time, the IO device repeats the address request purpose.

Conclusions and Interpretation

It will be appreciated that the above disclosure provides improved systems and method for auto addressing in control networks. In particular, the use of device data, network derived timestamp information, and the present protocols for device/controller interaction each provide significant respective advantages in terms of allowing a simple yet scalable auto addressing approach for control networks, such as those in building management systems. Furthermore, the technologies described herein are well suited to the latest forms of bus-based control networks, and readily applicable to wireless IO device communications arrangements.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The claims defining the invention are as follows:

1. A method for assigning network addresses to a plurality of IO devices in a control network, wherein the plurality of IO devices are connected to a controller through a common bus, the method including:
   at the controller, maintaining data indicative of a plurality of assignable network addresses;
   at a given IO device:
      defining a device identification code, wherein the device identification code includes a composite of (i) device data indicative of at least one of the device type and the device functionality and (ii) a timestamp-derived value representing the timing of a specified event at the device;
      storing the device identification code in local memory; and
      providing to the controller data indicative of a request for a network address, wherein the request includes the device identification code;

at the controller:
- receiving from the given IO device the data indicative of the request for a network address;
- identifying, from the data indicative of a plurality of assignable network addresses, a network address for assignment to the given IO device;
- providing to the given IO device data indicative of the identified network address and the device identification code;
- maintaining data indicative of the assignment of the identified network address to the given IO device; and at the given IO device:
- receiving from the controller the data indicative of the identified network address and the device identification code;
- verifying the received device identification code matches the device identification code stored in local memory; and
- in the case that the verification is successful, applying the identified network address.

2. A method according to claim 1 wherein the data indicative of at least one of the device type and the device functionality is defined by an Engineering Data Key (EDK) that is indicative of configuration aspects thereby to enable the given device to autonomously inform the controller how to meaningfully interact with the given device.

3. A method according to claim 1 wherein the timestamp-derived value representing the timing of a specified event at the device is generated based on a network event.

4. A method according to claim 1 wherein the controller uses the data indicative of at least one of the device type and the device functionality to facilitate control of the given IO device.

5. A method according to claim 1 wherein the control network is part of a building management system.

6. A control network including:
- a controller configured to maintain data indicative of a plurality of assignable network addresses; and
- a plurality of IO devices are connected to the controller through a common bus, each IO device being configured to define a device identification code, store the device identification code in local memory, and provide to the controller data indicative of a request for a network address, wherein the request includes the device identification code, wherein the device identification code includes a composite of (i) device data indicative of at least one of the device type and the device functionality and (ii) a timestamp-derived value representing the timing of a specified event at the device;
- wherein the controller is additionally configured to receive from each IO device the respective data indicative of a request for a network address, identify, from the data indicative of a plurality of assignable network addresses, respective network addresses for assignment to IO devices, respectively provide to the IO devices data indicative of the identified network addresses and the device identification code, and maintain data indicative of the respective assignment of the identified network address to the IO devices; and
- wherein the IO devices are additionally configured to receive from the controller the data indicative of the network addresses and associated device identification codes and, in the case that the associated device identification code that stored in local memory, apply the network address.

7. A control network according to claim 6 wherein data indicative of at least one of the device type and the device functionality is defined by an Engineering Data Key (EDK) that is indicative of configuration aspects thereby to enable the given device to autonomously inform the controller how to meaningfully interact with the given device.

8. A control network according to claim 6 wherein the timestamp-derived value representing the timing of a specified event at the device is generated based on a network event.

9. A control network according to claim 6 wherein the controller uses the device data to facilitate control of the given IO device.

10. A method for assigning network addresses to a plurality of IO devices in a control network, wherein the plurality of IO devices are connected to a controller through a common bus, the method including operating the controller to auto assign network addresses to the IO devices based on respective messages received from the IO devices, wherein each message includes a device identification code for the respective device, the device identification code being an autonomously generated composite of (i) data indicative of at least one of the device type and the device functionality and (ii) a timestamp-derived value representing the timing of a specified event at the device.

* * * * *